Figure 1:
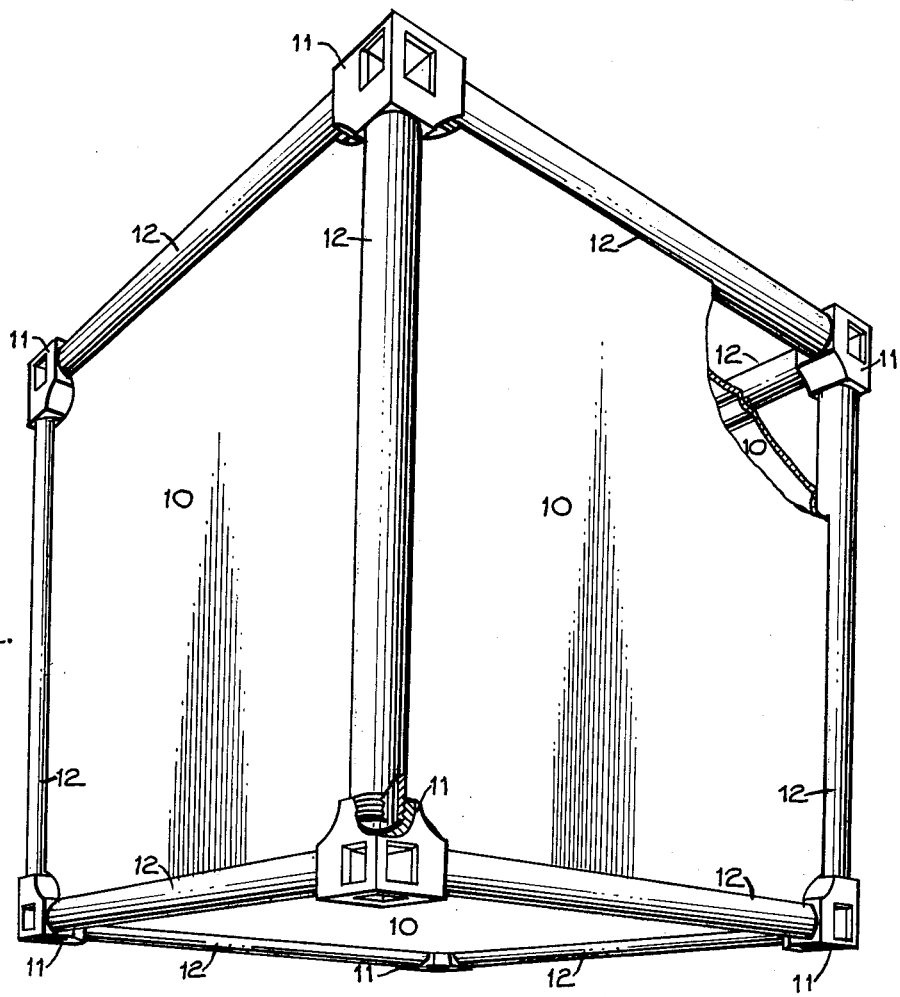

June 23, 1964 M. J. SILVERMAN 3,138,398
DEVICES FOR HANDLING CARGO CONTAINERS AND PALLETS
Filed July 17, 1961 2 Sheets-Sheet 1

Milton J. Silverman
*INVENTOR.*

June 23, 1964   M. J. SILVERMAN   3,138,398
DEVICES FOR HANDLING CARGO CONTAINERS AND PALLETS
Filed July 17, 1961                                2 Sheets-Sheet 2

*Milton J. Silverman*
INVENTOR.

United States Patent Office 3,138,398
Patented June 23, 1964

3,138,398
DEVICES FOR HANDLING CARGO CONTAINERS AND PALLETS
Milton J. Silverman, Grossmont, Calif.
(1360 Kirby Drive, La Habra, Calif.)
Filed July 17, 1961, Ser. No. 124,710
1 Claim. (Cl. 294—67)

My invention relates to devices for handling cargo containers and pallets and in particular to a framework structure for holding cargo containers and pallets and to material handling fittings for such framework structures and for cargo containers.

An object of my invention is the provision of fittings, for use as fittings on cargo containers and in box-shaped frameworks intended for use in holding cargo containers and cargo-holding pallets, which provide for the following: means for holding together the parts of the said framework structure; means whereby the cargo container or box-shaped framework structure can be readily lifted by means of ordinary hooks or wire straps and similar means or by specially designed coupling devices; means whereby the box-shaped framework structure or the cargo container can be readily lifted when resting on any of its six sides; means for use of identical fittings at each of the eight corners of the aforementioned container or framework structure; and another object of my invention is the provision of a framework structure for use in holding cargo containers and cargo-holding pallets which provides for ease of local fabrication of main structural members of the framework, ease of variation in the strength and size of the framework structure, and ease of demounting the framework structure, providing a means for economy in shipping costs for the demounted framework.

In connection with the objectives of the invention, it is to be understood that there is presently on the market certain corner fittings for use at the top corners of cargo containers which, together with specially designed couplers, provide a means for lifting the cargo containers. It is the practice to construct the corner fittings integral with the cargo container. One limitation of this practice, which it is one of the objects of this invention to overcome, is that when the container is intended for use as a watertight container for use in encasing cargo and floating such cargo on the waters of the world, as described in my co-pending application Serial Number 157,958 filed December 8, 1961, such container being propelled while so floating by external means, there are stresses set up within the container which make it difficult to maintain a watertight condition in that the joints, which would be inherent in such a practice, would tend to open and to spoil the watertight seal; this invention provides a separation of the lifting structure and the container structure and thus provides a means for seamless construction of the container and thus reduces the danger of leakage; secondly, this invention, by separating the lifting means, namely the framework structure, from the container, permits the use of the lifting means with more than one container and permits its use also with cargo-holding pallets, thus adding to the economic usefulness of the lifting means; thirdly, this invention provides a simple lifting and handling means for collapsible cargo containers such as described in my co-pending application previously mentioned, and further provides a means for easy inclusion of jackleg attachments, with the framework, for use in certain cargo delivery applications as will be described.

Figure 2:
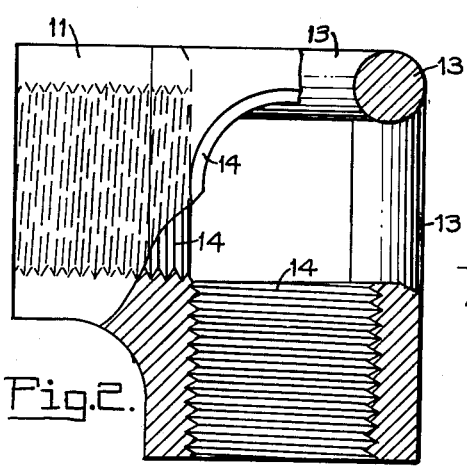
Figure 3:
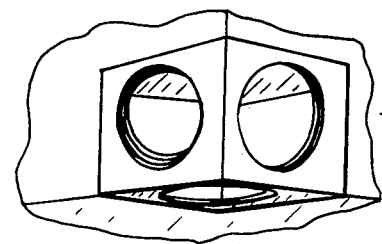
Figure 5:
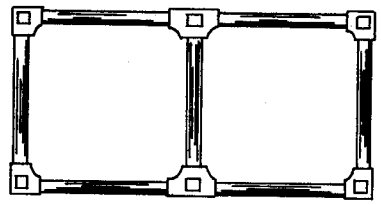
Figure 4:
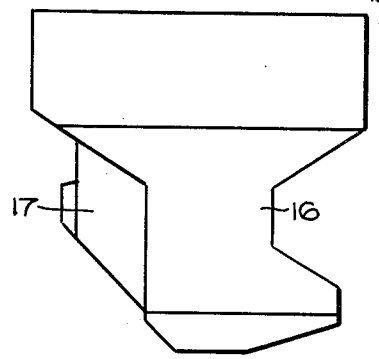
Figure 4:
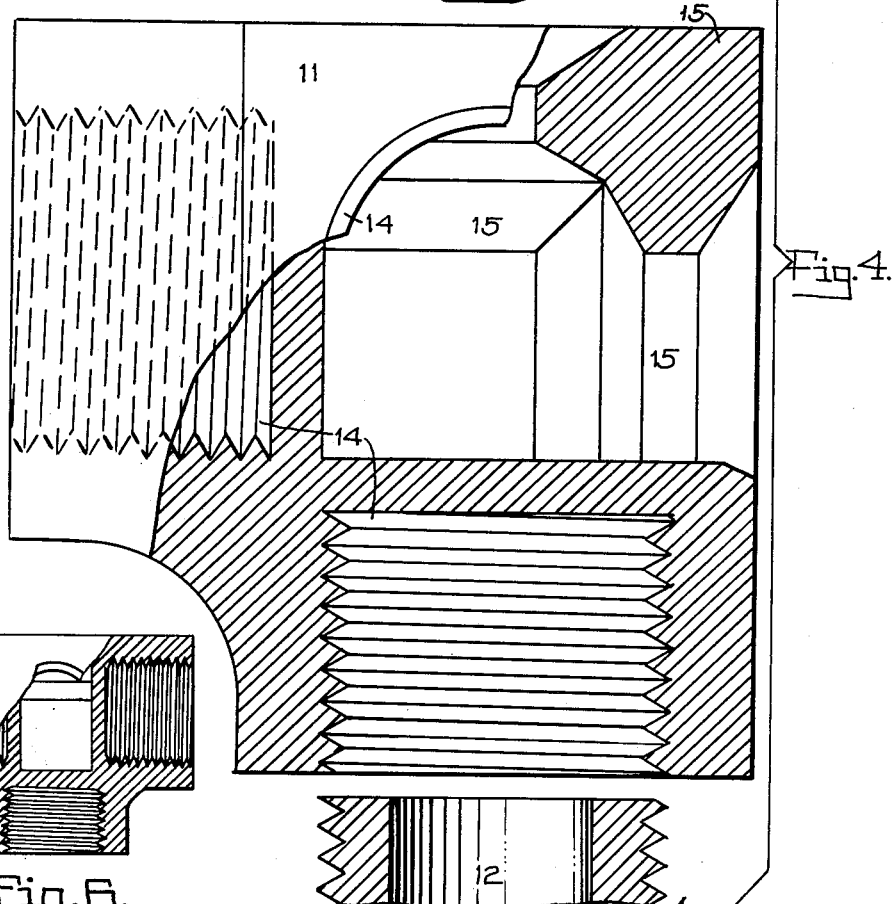
Figure 6:
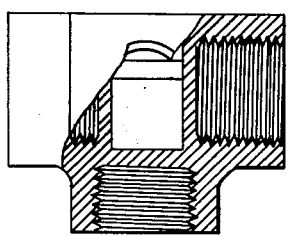
Figure 7:
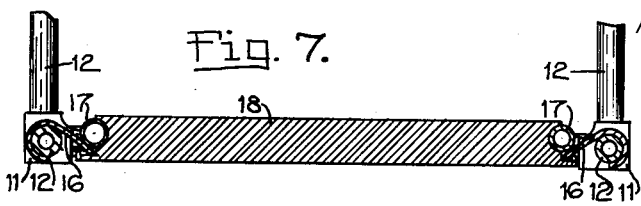

Other objects and a fuller understanding of the invention may be had by referring to the following description and claim, taken in conjunction with the accompanying drawings in which: FIGURE 1 shows a framework structure holding a cargo container; FIGURE 2 is a view of one side of a preferred embodiment of the corner fitting, which is a part of the framework structure, with certain parts broken away to more fully show the construction; FIGURE 3 is a perspective view of an alternate embodiment of the corner fitting shown fitted to a corner of a cargo container; FIGURE 4 shows one side of another embodiment of the corner fitting, similar to those corner fittings shown as part of the framework structure of FIGURE 1, with certain parts broken away, together with a side view of a typical lifting coupler and a partial sectional view of a pipe member of the framework structure; FIGURE 5 is a side view of a framework structure joined together by fittings having two faces and fittings having three open faces; FIGURE 6 is a side view of a fitting having two open faces, with certain parts broken away to more fully show the construction; and FIGURE 7 shows a partial sectional view of the framework structure holding a typical cargo-holding pallet.

With reference to the drawings, in FIGURE 1 a framework structure, comprising the corner fittings 11 and the pipe members 12, is shown holding a cargo container 10 similar to that described in my previously mentioned co-pending application; this particular cargo container 10 has grooves along each edge and is held within the framework structure by the pipe members 12 which fit into the grooves, the framework structure being assembled in the holding position shown by screwing the pipe members 12 into the corner fittings 11 and thus forming the box-shaped framework structure encaging the cargo container. The particular container shown, adaptable to floating cargo applications, is made up of a hollow section, comprising the four sides and the top, which may be made of fiberglass if desired, thus giving a seamless construction, and a bottom pallet section fitting thereto.

FIGURE 2 shows a preferred embodiment of the corner fitting 11; the pipe member 12 fit into the three threaded openings 14 which have longitudinal axes substantially at right angles one to another; the straight lifting bars 13 are also substantially at right angles one to another and provide a means for engagement of lifting means such as hooks or straps or special lifting couplers. The corner fitting is preferably made as one unit, preferably of metal. It can be seen that the corner fitting has three open faces threaded for insertion of the threaded pipe members 12.

In FIGURE 4 a typical lifting coupler, comprising essentially a hook part 16 and a locking latch 17, is shown in position above one of the open faces of an alternate embodiment of the corner fitting 11. One pipe member 12 is shown in position aligned with one of the threaded openings 14. The lifting bars 15 are shaped to accommodate the hook part of the lifting coupler; the action of the typical lifting coupler shown is briefly described as follows: as the lifting coupler, which is normally attached to a lifting frame (handled by a crane), is lowered into one of the three openings of the corner fitting the locking latch 17 recedes against spring pressure into a recess in the body of the hook part 16 and the lifting coupler is thus free to enter the opening; when the lifting coupler is fully seated the locking latch 17 returns to the fully extended position and is locked, by internal means, in such position, thus holding the lifting coupler locked to the corner fitting 11 in that the hook part of the lifting coupler is held by the lifting bar 15 of the corner fitting 11. To unlock the coupler from the corner fitting, the locking latch is unlocked; this permits the locking latch 17 to recede into the recess in the hook part 16 and permits the lifting coupler to be withdrawn from the corner fitting 11 in that the hook part 16 can slide free of the lifting bar 15.

Three lifting bars 15 are provided and each lifting bar has two surfaces which can engage the hook part 16 of the lifting coupler; thus the lifting coupler can be inserted in two different directions, rotated about the longitudinal axis of the coupler (at right angles one to another) into each of the three open faces of the corner fitting 11. Each of the eight corner fittings 11 of a cargo container or framework structure are identical, there being no "right-hand left-hand" fittings.

It is expected that the framework structures of the invention will be lifted by the following means: when the framework structure is made up of the corner fittings shown in FIGURE 2, together with pipe members 12, typical lifting means would be ordinary hooks or straps, or special lifting couplers, such as the "ice tongs" type, or such couplers as may in the future be designed to engage such commonly seen pin-type lifting bars as those shown in FIGURE 2 as 13. When the framework is made up of the corner fittings shown in FIGURE 3, together with pipe members 12, typical lifting means would be ordinary hooks and straps, passed to engage the lifting bars, in those cases when specially designed lifting couplers might not be readily available, or special lifting couplers such as hereinbefore described. In both such frameworks it is anticipated that lifting frames would ordinarily be employed to hold the special lifting couplers, such lifting frames consisting essentially of a square or rectangular panel with the lifting couplers at the corners, said frame being handled by lifting means such as a crane. In those cases where the framework structure is made cube in shape, as for example to hold a cube-shaped cargo container, it can be seen that such a lifting frame, square in shape and of a size to conform to the square shape of each of the sides of the framework structure, would provide lifting couplers to engage the corner fittings of the framework structure and that such lifting couplers would be in a position to engage any of the six sides of the framework structure and, further, that the lifting frame would be in a position to engage any of the six sides from any of the four possible orientations of the frame when matched to a side of the framework structure. This feature is of particular advantage in such cases as the following: when a cargo container is constructed so as to have five closed faces, and one open face provided with a closure panel, such as that previously described such a container can well be used for carrying either bulk cargo or unitized cargo; in the former case it is desirable that the open face be facing upward for loading the bulk cargo and it is oftentimes desirable that it be turned upside down at a later time to dump the bulk cargo and it is therefore desirable that it be easily engageable from both the top and the bottom; secondly, in those cases where containers are used in transferring cargo by the floating cargo method previously mentioned, it is possible that wave action, or handling accidents, may turn the container so that any of the six sides is uppermost, and in such cases it is desirable that the framework structure be engageable from any of the six sides so that it can readily be finally lifted from the water; thirdly, it is desirable that in those cases where cube-shaped framework structures are employed, lifting frameworks be engageable to the framework structure from any of the four possible directions of orientation, when the lifting frame is aligned with the framework structure, so that a prime mover for the lifting frame, such as, for example, a straddle truck, can approach the framework structure from any of the four sides of the said framework structure, and successfully position its lifting frame, thus providing means for more quickly engaging the framework structure than in those cases where such prime mover might otherwise have to more fully maneuver to accomplish such engagement. What has been said of framework structures in the foregoing applies equally well to cargo containers.

Although the pipe members 12 are shown to have threaded ends, and the corner fittings are shown to have threads to receive such threaded pipe fittings, it can be seen that other suitable means can be used to hold the parts together, and to provide also for disassembly, such as, by way of example, slip fittings fitted with locking keys and, also, bayonet fittings and the like.

When it is desired that a very large container be lifted it is desirable that lifting points intermediate the corners be provided as shown in FIGURE 5. Such fittings, shown in detail in FIGURE 6, have two open faces instead of three, and have four faces fitted to receive pipe members. The containers lifted by such frameworks would normally be provided with grooves, or similar means, adjacent the intermediate pipe members; normally the lower intermediate fittings would not have pipe members fitted to span the bottom of the container, since such would interfere with detaching the top from the bottom section of the container, although such a procedure could be followed, and could be incorporated with quick releasing bottom span pipe members.

The objective of the invention which relates to provision of separation of the lifting structure from the container can be served even though the elongated structural members of the framework are not made of pipe and even though they are not demountable. Thus elongated structural members can be permanently formed as a framework, joined by lifting fittings, the container "floating" therein. In this connection it is to be noted that fittings of the type herein disclosed need not be employed in order to form such a framework; fittings of other types can be joined to such structural members by welding and other such means, to form such an encaging framework. FIGURE 5 adequately illustrates the construction herein described.

Certain types of cargo, such as, for example, automobiles and other unitized cargo, do not ordinarily call for containerization during shipment and in such cases the framework structure of this invention would be used to hold a cargo-holding pallet instead of a cargo container. FIGURE 7 shows a cargo-holding pallet such as that described in my previously mentioned co-pending application, further described briefly as follows: the panel 18 holds on its periphery an air-expanding tube 17 which surrounds the periphery, being held thereto by suitable means such as the groove shown. To adopt the framework structure to hold such a pallet, adapter lips 16 are fitted and held in fixed position, as shown, on the pipe members 12 of the framework structure. To attach the cargo-holding pallet 18 in the position shown, the air-expandable tube 17 is placed in the fully relaxed position by allowing any air pressure which may be present within to escape by releasing the air through a suitable valve; in this position the tube 17 recedes a sufficient amount into its holding groove to allow the pallet 18 to be moved up into position against the adapter lips 16 substantially as shown. The air expandable tube 17 is then inflated and locked in the inflated position substantially as shown and the pallet is thus locked into position in that downward movement is prevented by the air-expanded tube 17 bearing against the adapter lips 16 and upward movement is prevented by the lower bearing surface of the pallet 18 bearing against the adapter lips 16. It is apparent that many different methods can be used to attach pallets, of many different types, to the framework structure and I do not wish to be limited to the specific method, or type of pallet, hereinbefore described. It can be seen that a pallet, attached or supported by the framework structure, provides a means for holding cargo thereon and that the framework structure provides a lifting and handling means for the pallet. As described in my previously mentioned co-pending application the framework, pallet, and a flexible hollow section make up a collapsible shipping container. It is apparent that many methods can be devised to hold cargo containers substantially within the framework structure, and I do not wish to be limited to the method hereinbefore described, nor to be limited to the cargo container described inasmuch as many types of cargo containers can be held by the framework by suitable means.

The construction of the coner fittings and the method of forming the framework structure by fitting together the pipe members 12 with corner fittings such as shown in FIGURE 2 permits a simple method of including jacklegs as part of the framework structure when such inclusion is desirable; such jacklegs would be useful in dropping off framework structures, with such cargo as may be held thereby, from flat bed trucks (the framework structures overhanging sides of the flat bed to a certain degree) by extending the jacklegs so that they bear upon the ground surface to support the framework structure, after which the truck is driven clear leaving the framework structure and cargo supported by said jacklegs. Such jacklegs could be included as threaded pipe sections fitted within the four vertically oriented pipe members of the framework structure, such pipe members being threaded along their interior length and said jacklegs being threaded along their exterior length; the jacklegs could be extended from their position within the four pipe members by threading them out, an open face of the corner fitting permitting egress therethrough, and could be run back along the threads to the housed position when desired. Other methods could be devised to so extend the jacklegs from positions within the length of the selected pipe members and retract them. It is to be noted that such a provision for jacklegs would be independent of the cargo containers and pallets, thus simplifying construction and enhancing economy, and would involve only a replacement of four pipe members with four jackleg pipe members of substantially the same size to accomplish. The pipe members 12, when not of the jackleg attachment variety, can be made from ordinary pipe and threaded with ordinary pipe threaders, thus providing for ease of local fabrication when desired; further, it is seen that the method of forming the framework provides a simple means for altering the size and shape and strength of the framework structure in that various lengths and various strengths of pipe members can be used, even including solid bar stock when great strength is required, it being understood that in this latter case the jackleg attachments might not be used.

It is apparent that the corner fittings can be attached directly to the corners of cargo containers, much in the same manner as corner fittings presently on the market are attached, and that the corner fittings need not include the three threaded fittings in such cases. Such a fitting is shown in FIGURE 3. I do not wish to be limited to usage of the corner fittings to the framework structure hereinbefore described. FIGURE 3 illustrates also that the lifting bars need not be straight, and that the openings in the faces need not have a direction of orientation as, for example, when such openings are circular in end plan shape. Such circular openings would be used to receive either standard handling means such as hooks and straps or special lifting couplers such as the bayonet type or other types which are substantially circular in end plan, and it is further to be noted that the edge surfaces of the three openings need not have a direction of orientation as for example in those cases where the opening is circular in end plan and when there is no need for special configuration of the edge openings as for example when such openings are intended to receive ordinary hooks and straps, or to receive lifting couplers, circular in end plan, which do no rely for locking means upon special configuration of the edge surfaces but rather on such factors as the large size of the hollow interior in relation to the openings; such a coupler might be, for example, an air expanding ball which relies for locking means upon expansion after insertion into the corner fitting.

Although the invention has been described with a certain degree of particularity, it is understood that the present disclosure has been made only by way of example and that numerous changes in the details of construction may be resorted to without departing from the spirit and the scope of the invention as hereinafter claimed.

I claim as my invention:

A cargo container comprising in combination a rigid box-shaped container and a framework; said box-shaped container having edges having means formed for receiving elongated framework structural members; said framework comprising in combination elongated structural members and corner fittings; said structural members fitted to aforesaid means for receiving said members and joined by the corner fittings to form a box-shaped framework; said corner fittings having means to receive lifting means.

References Cited in the file of this patent

FOREIGN PATENTS

| | | |
|---|---|---|
| 542,889 | Italy | of 1956 |
| 1,198,045 | France | of 1959 |